United States Patent

Gottschalk et al.

[11] 4,040,587
[45] Aug. 9, 1977

[54] CAMERA CRADLE TILT MECHANISM

[75] Inventors: Robert E. Gottschalk; Albert K. Saiki, both of Los Angeles, Calif.

[73] Assignee: Robert E. Gottschalk, Los Angeles, Calif.

[21] Appl. No.: 577,728

[22] Filed: May 15, 1975

[51] Int. Cl.² ............................................ F16M 11/12
[52] U.S. Cl. ..................................... 248/185; 354/293
[58] Field of Search ............... 248/397, 139, 141, 130, 248/178, 183, 184, 185; 354/293

[56] References Cited

U.S. PATENT DOCUMENTS

| 1,493,367 | 5/1924 | Mery | 248/183 |
| 1,943,360 | 1/1934 | Arnold | 248/183 |
| 2,256,556 | 9/1941 | Gibbons | 248/183 UX |
| 2,333,306 | 11/1943 | Fishter | 248/183 |
| 2,796,226 | 6/1957 | Dalton et al. | 248/183 |
| 3,643,518 | 2/1972 | Semin et al. | 74/234 |
| 3,740,011 | 6/1973 | Dickson | 248/183 |
| 3,863,902 | 2/1975 | O'Brien et al. | 248/130 |

Primary Examiner—J. Franklin Foss
Attorney, Agent, or Firm—Lyon & Lyon

[57] ABSTRACT

A camera cradle tilt mechanism for professional motion picture photography employs a flexible toothed belt having its ends fixed to an arcuate undersurface of the camera cradle. The toothed belt passes around a pinion gear so that turning of the pinion gear controls the tilting position of the camera cradle. The pinion gear is adjustably mounted to take up any slack in the belt which develops because of wear.

4 Claims, 4 Drawing Figures

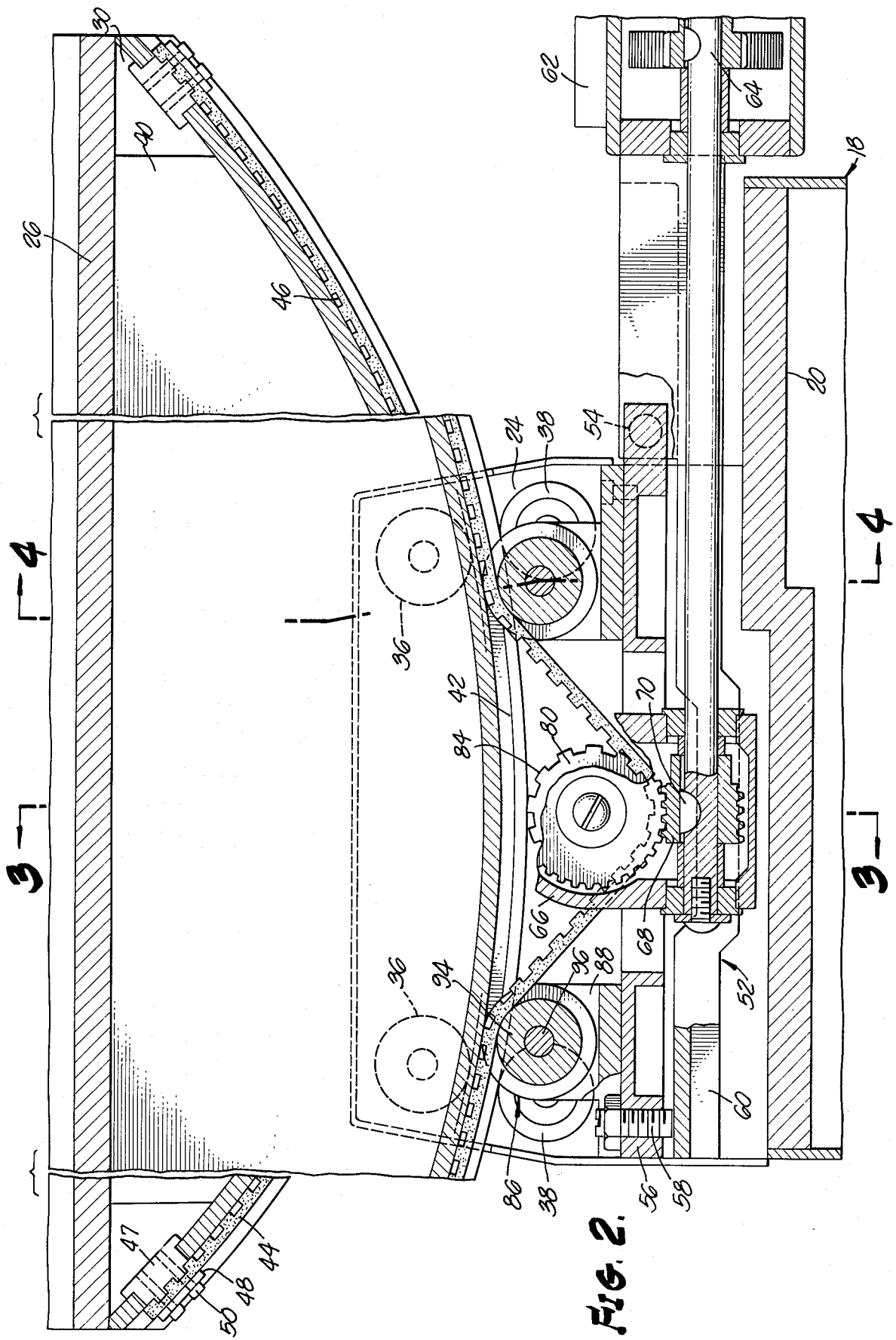

CAMERA CRADLE TILT MECHANISM

BACKGROUND OF THE INVENTION

This invention is directed to camera cradles for photographic equipment. More specifically, this invention is directed to a mechanism for controlling the movement and the position of a camera cradle for photographic equipment.

In the field of professional motion picture photography, camera cradles have been developed for allowing a change in directional elevation of the camera without removing the camera from its support base. Generally such cradles include pivotal movement relative to the support base as a means for providing the capability of changing the directional elevation of the camera. One method for pivotally mounting such camera cradles to a support frame has been to provide arcuate flanges in association with a camera mounting platform defining the camera cradle, the arcuate flanges being positioned between rollers fixed on the support frame. A third arcuate flange also associated with the camera mounting platform includes gear teeth along one side thereof to mate with a pinion rotatably mounted in the support frame to control the pivotal position of the camera cradle relative to the support frame.

Commonly, such devices are used for very small degrees of tilt far more than they are used for large variations in elevation. Consequently, the gear fixed to the arcuate flange tends to wear out right around the level position. This wear can be overcome by readjusting the position of the pinion. However, the unworn portions of the gear segment used for larger changes in elevation will bind with the readjusted pinion.

SUMMARY OF THE INVENTION

The present invention is directed to a tilt mechanism employing a flexible, toothed belt segment fixed at each end and extending to wrap around the pinion for replacing the conventional gear segment as a means for controlling the elevation of a camera cradle. An adjustable gear mounting assembly is fixed to the support base and rotatably holds the pinion such that adjustments may be made in the position of the pinion relative to the cradle to keep the belt segment from becoming slack on the pinion. Consequently, backlash due to wear of the belt segment may be eliminated by reestablishing the original tension in the belt. As the original tension need not be exceeded, the tilt mechanism will perform at the seldom used large elevations without binding while eliminating backlash at the more frequently used elevations.

Accordingly, it is an object of the present invention to provide an improved tilt mechanism.

It is another object of the present invention to provide a tilt mechanism allowing adjustments to compensate for the wear of the tilt control mechanism.

Other and further objects and advantages will appear hereinafter.

BRIEF DESCRIPTION OF THE DRAWINGS

FIG. 2 is a cross-sectional elevation exposing the flexible, toothed belt segment and the pinion.

DETAILED DESCRIPTION OF THE DRAWINGS

Figure 1:
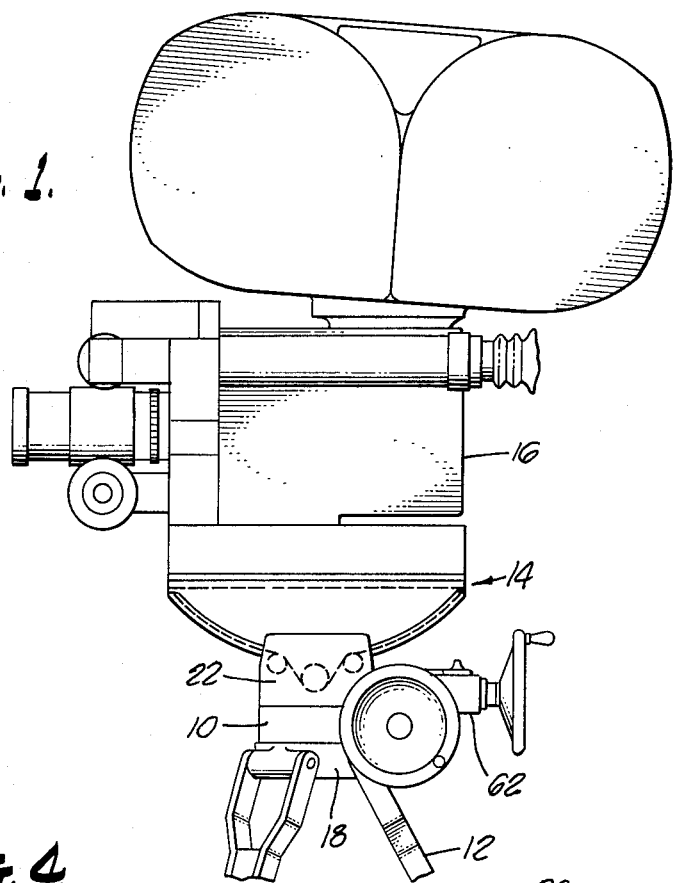
FIG. 1 is an elevation of the present invention with a camera in place.
Figure 4:
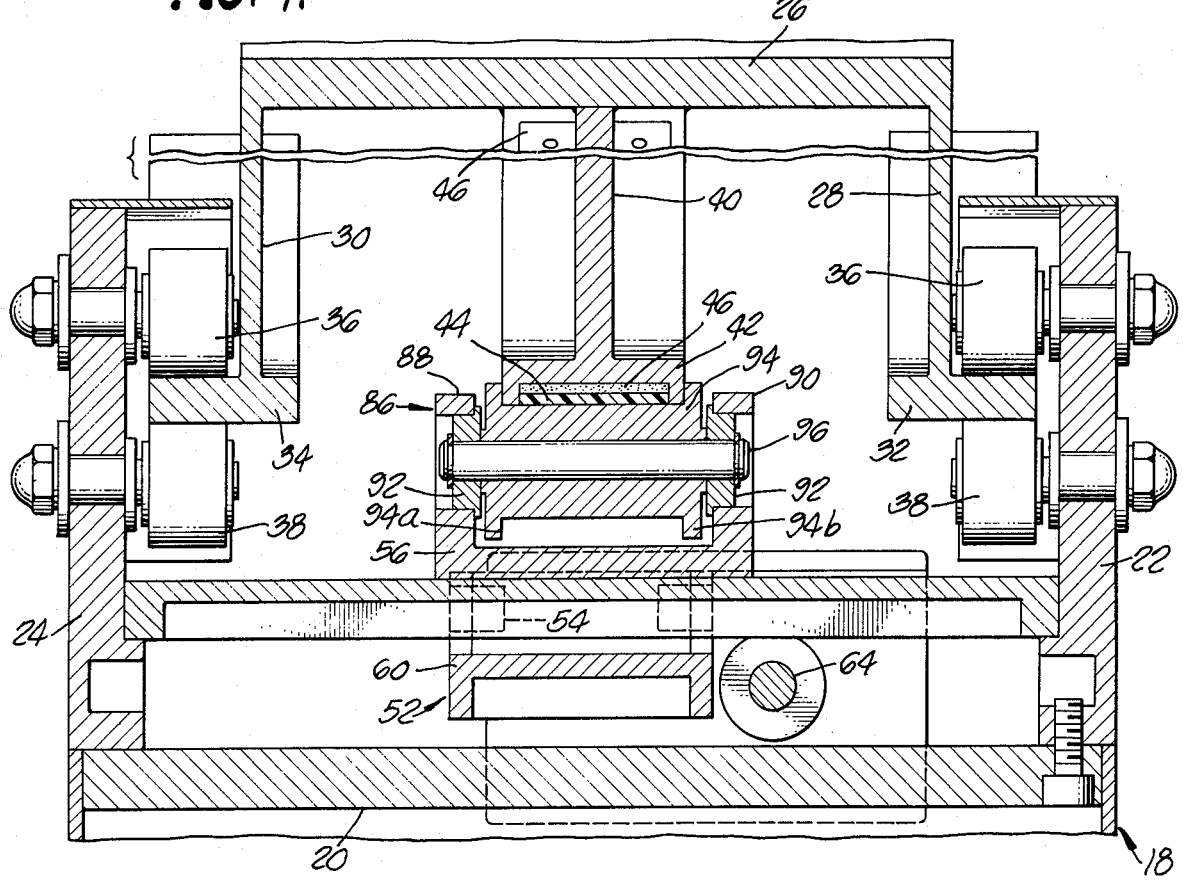
FIG. 4 is a cross-sectional elevation taken along line 4—4 of FIG. 2.

A tilt mechanism is shown as including a support frame 10 extending as a tripod with legs 12 and a camera cradle, generally designated 14, on which a camera 16 may be positioned. The support frame 10 includes a conventional base structure 18 including a plate 20. Extending upwardly from either side of the base structure 18 are parallel mounting plates 22 and 24. The camera cradle 14 includes a camera mounting platform 26 extending to depending legs 28 and 30. The bottom side of each leg 28 and 30 forms a segment of a circle and arcuate flanges 32 and 34 extend from legs 28 and 30 respectively.

Mounting means for mounting the camera cradle 14 on the support frame 10 allow the camera cradle 14 to pivot relative to the support frame 10. These mounting means include the arcuate flanges 32 and 34 which conform to a constant radius of curvature, upper rollers 36 and lower rollers 38. There are two upper rollers 36 associated with each of flanges 32 and 34 as well as two lower rollers 38 associated with each flange. The upper and lower rollers 36 and 38 are mounted on the parallel mounting plates 22 and 24 by conventional means in an arrangement such that each upper roller 36 is associated with a lower roller 38 to hold the flanges 32 and 34 therebetween. As the flanges 32 and 34 have a constant radius of curvature, these flanges 32 and 34 may be rolled through the pairs of rollers 36 and 38 to provide a pivotal motion to the camera cradle 14 relative to the support frame 10 about a horizontal axis passing through the origin of each radius of curvature defined by the arcuate flanges 32 and 34.

Tilt control means for controlling the pivotal position of the camera cradle 14 relative to the support frame 10 is included between the assemblies for supporting the camera cradle 14 on the support frame 10. This tilt control means includes a third depending leg 40 extending from the camera mounting platform 26. The depending leg 40 extends to a shallow, arcuate channel 42. The channel 42 has the same radius of curvature as the two arcuate flanges 32 and 34, and they all have the same axis. Positioned within the channel 42 and attached at either end to the channel 42 near the camera mounting platform 26 is an elongated flexible member or strap forming a flexible toothed belt segment 44. The flexible toothed belt segment 44 includes teeth 46 oriented such that they face the channel 42, and the belt segment 44 itself extends parallel to a plane which is perpendicular to the pivot axis of the camera cradle 14. In this way, a uniform control may be maintained by constraining the belt segment 44 at one location intermediate the ends thereof. Mounting brackets 47 cooperate with mounting plates 48 and fasteners 50 which extend through the ends of the belt segment 44 to the camera cradle 14 such that force on the belt is transmitted to move or locate the camera cradle 14 relative to the support frame 10. The belt segment 44 is similar in construction to a flexible timing belt used between the crankshaft and camshaft in an automobile engine which are usually of rubber-like resilient material. Such belts are reinforced to provide excellent longitudinal dimensional stability. The belt segment 44 is longer than the path provided by the channel 42 in order that it may partially encompass the pinion gear, as will be more fully discussed below.

The support frame 10 includes an adjustable gear mounting assembly generally designated 52 which is pivotally mounted relative to the base structure 18 about pins 54. The base structure 18 includes a mounting platform 56 which supports the pins 54. A set screw 58 fixed in the mounting platform 56 is used to adjust and hold the relative position of the adjustable gear mounting assembly 52 relative to the base structure 18. Thus, the pins 54 and the set screw 58 act to determine the vertical placement of the portion of the adjustable gear mounting assembly 52 between the pins 54 and the set screw 58 relative to the base structure 18 and in turn the mounting brackets 47 on the supported camera cradle 14.

The adjustable gear mounting assembly 52 includes a support channel 60 to which is mounted a gear reduction unit 62 and a drive shaft 64 which extends to the pinion drive and mounting assembly, also supported by the support channel 60. The pinion drive and mounting assembly includes a housing 66 which encloses and supports the pinion and its drive assembly. The drive shaft 64 extends to a worm 68 which is held on the drive shaft 64 by key 70. A worm wheel 72 engages the worm 68 and is driven or held thereby. A pinion shaft 74 is positioned horizontally through the housing 66 in bushings 76 and 78 fixed in the housing 66. The pinion shaft 74 rotatably supports the worm wheel 72 which is fixed to rotate therewith by a key 73. The pinion shaft 74 also supports a pinion 80 which is fixed to rotate with the pinion shaft 74 by key 82. Thus, the drive shaft 64 is able to control the position and movement of the pinion 80 through the worm 68 and worm wheel 72.

The pinion 80 includes teeth 84 which mate with the flexible, toothed belt segment 44. The pinion 80 is positioned directly below the channel 42 in order that the flexible toothed belt segment 44 may pass from its position in the channel around the pinion 80 where it will in turn be controlled by the drive shaft 64. The relative vertical position of the pinion 80 may be changed by manipulating the set screw 58 to adjust the position of the adjustable gear mounting assembly 52. In this way, reduced tension in the belt due to wear and other factors and resulting gear back lash may be eliminated by uniformly increasing the tension of the belt to its original level in areas away from the major wear section in the middle of the belt segment 44 as well as in the major wear area. Thus, a uniform load is required to move the pinion along the belt segment 44 regardless of the wear at the center section of the belt segment 44.

To hold the belt segment 44 about the pinion 80 and also in the channel 42, two roller assemblies generally designated 86 are provided on either side of the pinion 80 and fixed to the mounting platform 56. Support brackets 88 and 90 extend up from the main portion of the mounting platform 56 to receive bushings 92. Rollers 94 are rotatably mounted between the support brackets 88 and 90 on roller shafts 96. Two such rollers 94 are employed, one on each side of the pinion 80. The rollers 94 hold the belt segment 44 in the channel 42 to maintain a constant relationship between the pinion 80 and the belt segment 44 in spite of the relative position of the camera cradle 14. As the rollers 94 are fixed to the mounting platform 56, they are unaffected by changes in the position of the pinion gear 80. Therefore, the proper relationship remains between the belt segment 44 and the pinion gear 80 even though the position of the pinion gear 80 may be changed to take up slack. Furthermore, the closeness of the rollers 94 to the pinion gear 80 cause the belt segment 44 to wrap about the pinion gear 80, as can best be seen in FIG. 2. As more teeth are in mesh between the pinion gear 80 and the belt segment 44, less pressure and wear are placed on each tooth.

The flanges 94 a and 94 b on the rollers 94 constrain lateral movement of the camera cradle 14 by contact with the parallel lateral edges of the leg 40.

Figure 3:
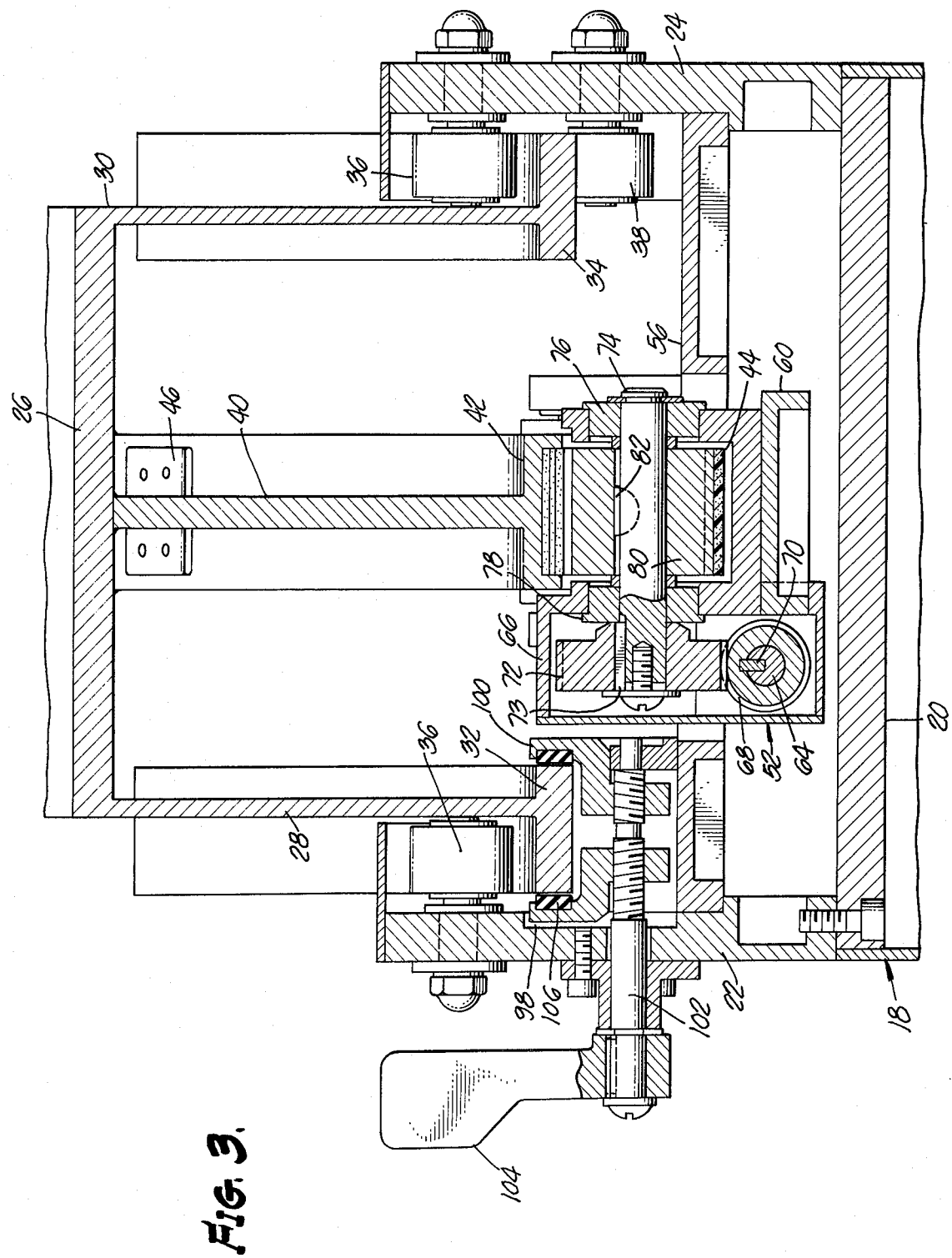
FIG. 3 is a cross-sectional elevation taken along line 3—3 of FIG. 2.

A locking mechanism is shown in FIG. 3. This locking mechanism includes two brake shoes 98 and 100. The brake shoes are mounted on a common shaft 102 which may be driven by a handle 104. The common shaft 102 includes both left-handed and right-handed threads in association with the brake shoes 98 and 100 in order that rotation of shaft 102 will bring the brake shoes 98 and 100 into contact with the arcuate flange 32. Brake pads 106 are employed to increase the braking capability of the braking device.

Having fully described our invention, it is to be understood that we are not to be limited to the details herein set forth, but that our invention is of the full scope of the appended claims.

We claim:

1. A tilt mechanism for a cradle comprising: a support frame, a cradle, mounting means for mounting said cradle on said support frame such that said cradle may move about a fixed axis in an arc relative to said support frame, said tilt frame having an arcuate surface concentric to said axis, tilt control means for controlling the position of said cradle relative to said support frame, said tilt control means including an elongated toothed strap member of resilient material fixed at each end thereof to said arcuate surface, gear means engaging and partially encompassed by said elongated toothed member, and means for turning said gear means.

2. The tilt mechanism of claim 1 wherein an adjustable gear mounting assembly on said support frame supports said gear means, said adjustable gear mounting assembly being capable of moving said gear means toward and away from said cradle to vary the tension in said toothed member.

3. A tilt mechanism as defined in claim 1 wherein said toothed member comprises a belt segment having teeth projecting toward said arcuate surface, a rotary gear engaging said teeth, and means for controlling the position of said gear, said means being mounted on the support frame.

4. A tilt mechanism for a cradle comprising:
a support frame, a cradle, mounting means for mounting said cradle on said support frame such that said cradle may move in an arc relative to said support frame, tilt control means for controlling the position of said cradle relative to said support frame, said tilt control means including an elongated flexible toothed member fixed at each end thereof to said cradle, gear means engaging and partially encompassed by said elongated flexible toothed member, and means for turning said gear means, said cradle including an arcuate channel for receipt of said elongated flexible member, and roller means are provided adjacent said gear means on either side thereof for retaining said elongated flexible member in said arcuate channel.

* * * * *